United States Patent
Makuni et al.

(10) Patent No.: US 11,461,225 B2
(45) Date of Patent: Oct. 4, 2022

(54) STORAGE DEVICE, CONTROL METHOD OF STORAGE DEVICE, AND STORAGE MEDIUM

(71) Applicant: BUFFALO INC., Nagoya (JP)

(72) Inventors: Kazuki Makuni, Nagoya (JP); Shuichiro Azuma, Nagoya (JP); Noriaki Sugahara, Nagoya (JP); Yu Nakase, Nagoya (JP)

(73) Assignee: BUFFALO INC., Nagoya (JP)

( * ) Notice: Subject to any disclaimer, the term of this patent is extended or adjusted under 35 U.S.C. 154(b) by 93 days.

(21) Appl. No.: 16/823,342

(22) Filed: Mar. 19, 2020

(65) Prior Publication Data

US 2020/0319999 A1 Oct. 8, 2020

(30) Foreign Application Priority Data

Apr. 5, 2019 (JP) .............................. JP2019-073071

(51) Int. Cl.
*G06F 12/02* (2006.01)
*G06F 12/0846* (2016.01)
*G06F 12/0882* (2016.01)

(52) U.S. Cl.
CPC ...... *G06F 12/0246* (2013.01); *G06F 12/0253* (2013.01); *G06F 12/0848* (2013.01); *G06F 12/0882* (2013.01)

(58) Field of Classification Search
None
See application file for complete search history.

(56) References Cited

U.S. PATENT DOCUMENTS

| 8,332,573 | B2 * | 12/2012 | Jeong ..................... G06F 12/10 711/103 |
| 2006/0044934 | A1 * | 3/2006 | Wong .................. G06F 12/0246 711/E12.008 |
| 2008/0104357 | A1 * | 5/2008 | Kim ..................... G06F 12/0246 711/170 |
| 2008/0209107 | A1 * | 8/2008 | Murray ................. G11C 29/04 711/103 |

(Continued)

OTHER PUBLICATIONS

Wikipedia, "Trim (computing)," Retrieved from the on Internet URL: https://en.wikipedia.org/wiki/Trim_(computing), on Mar. 16, 2020, 6 pages.

*Primary Examiner* — Yaima Rigol
(74) *Attorney, Agent, or Firm* — Xsensus LLP

(57) ABSTRACT

A storage device comprises a flash memory and processing circuitry. The processing circuitry is configured to divide a storage area into pages to manage the storage area, and deletes each of the blocks including a plurality of pages. The processing circuitry receives a write instruction including address information specifying a writing location of the data, and stores, with respect to a plurality of groups in which each group includes one or more blocks, a plurality of group identification information each identifying a group and information specifying blocks included in the group in association with each other. The processing circuitry performs a predetermined calculation to obtain group identification information, and identifies a group including a block including pages onto which data is to be written according to the write instruction. Finally, the processing circuitry writes the data onto the pages of the block included in the group identified.

20 Claims, 6 Drawing Sheets

(56) References Cited

U.S. PATENT DOCUMENTS

| | | | |
|---|---|---|---|
| 2011/0010489 A1* | 1/2011 | Yeh | G06F 12/0246 |
| | | | 711/E12.001 |
| 2013/0254459 A1* | 9/2013 | Laplace | G06F 21/53 |
| | | | 711/E12.008 |
| 2017/0371781 A1* | 12/2017 | Choi | G06F 3/0608 |
| 2018/0181320 A1* | 6/2018 | Ji | G06F 3/0619 |
| 2019/0087323 A1* | 3/2019 | Kanno | G06F 3/0659 |
| 2019/0220416 A1* | 7/2019 | Jung | G06F 12/1009 |
| 2020/0192791 A1* | 6/2020 | Yang | H04L 1/203 |

\* cited by examiner

*FIG. 3*

| GROUP IDENTIFICATION INFORMATION | BLOCKS |
|---|---|
| 1 | 1, 2 |
| 2 | 3, 4 |
| ⋮ | ⋮ |

STORAGE DEVICE, CONTROL METHOD OF STORAGE DEVICE, AND STORAGE MEDIUM

CROSS-REFERENCE TO RELATED APPLICATIONS

This application is based on and claims priority under 35 USC § 119 from Japanese Patent Application No. 2019-073071 filed on Apr. 5, 2019, the contents of which are incorporated herein by reference in their entirety.

TECHNICAL FIELD

The present disclosure relates to a storage device, a control method of the storage device, and a storage medium.

BACKGROUND

There is a technique (a trim command) for notifying a drive of blocks which are no longer in use, from a host-side OS (Operating System) (for example, a URL "https://en.wikipedia.org/wiki/Trim_(computing)" searched from the Internet by "inet:Trim_(computing)" on Mar. 25, 1991). If the trim command is issued, a SSD (Solid State Drive) performs garbage collection.

However, while the garbage collection is performed, the host cannot read and write data. Therefore, the host needs to wait for the processing to end.

An object of the present disclosure is to provide a storage device, which is a storage device using a NAND (Not AND) flash memory, that reduces a number of times of garbage collection, thereby reducing a waiting time of the host for processing.

SUMMARY

The present disclosure provides a storage device comprising a flash memory and processing circuitry. The processing circuitry is configured to divide a storage area of the flash memory into pages to manage the storage area, data being written in units of the pages; perform a deleting process in units of blocks in response to receiving a deletion instruction, each of the blocks including a plurality of pages; receive, as a write instruction for writing data, an instruction including address information specifying a writing location of the data; store, with respect to a plurality of groups in which each group includes one or more blocks, a plurality of group identification information in which each identifies a group and information specifying blocks included in the group in association with each other; perform a predetermined calculation based on the address information included in the received write instruction to obtain group identification information, of the plurality of group identification information, identifying a group including a block including pages onto which data is to be written according to the write instruction; and write the data onto the pages of the block included in the group identified by the obtained group identification information, based on the received write instruction.

The present disclosure further provides a control method of a storage device including a flash memory. The control method comprises dividing a storage area of the flash memory into pages to manage the storage area, data being written in units of the pages; performing a deleting process in units of blocks in response to receiving a deletion instruction, each of the blocks including a plurality of pages; receiving, as a write instruction for writing data, an instruction including address information specifying a writing location of the data; storing, with respect to a plurality of groups in which each group includes one or more blocks, a plurality of group identification information in which each identifies a group and information specifying blocks included in the group in association with each other; performing a predetermined calculation based on the address information included in the received write instruction to obtain group identification information, of the plurality of group identification information, identifying a group including a block including pages onto which data is to be written according to the write instruction; and writing the data onto the pages of the block included in the group identified by the obtained group identification information, based on the received write instruction.

The present disclosure further provides a non-transitory computer-readable storage medium storing a program for causing a controller of a storage device including a flash memory to perform a process. The process comprises dividing a storage area of the flash memory into pages to manage the storage area, data is written in units of the pages; performing a deleting process in units of blocks in response to receiving a deletion instruction, each of the blocks including a plurality of pages; receiving, as a write instruction for writing data, an instruction including address information specifying a writing location of the data; storing, with respect to a plurality of groups in which each group includes one or more blocks, a plurality of group identification information in which each identifies a group and information specifying blocks included in the group in association with each other; performing a predetermined calculation based on the address information included in the received write instruction to obtain group identification information, of the plurality of group identification information, identifying a group including a block including pages onto which data is to be written according to the write instruction; and writing the data onto the pages of the block included in the group identified by the obtained group identification information, based on the received write instruction.

BRIEF DESCRIPTION OF THE DRAWINGS

FIG. 3 is an explanatory view illustrating an example of a group table which is held by the storage device according to the embodiment of the present disclosure;

DESCRIPTION OF EMBODIMENTS

Figure 1:
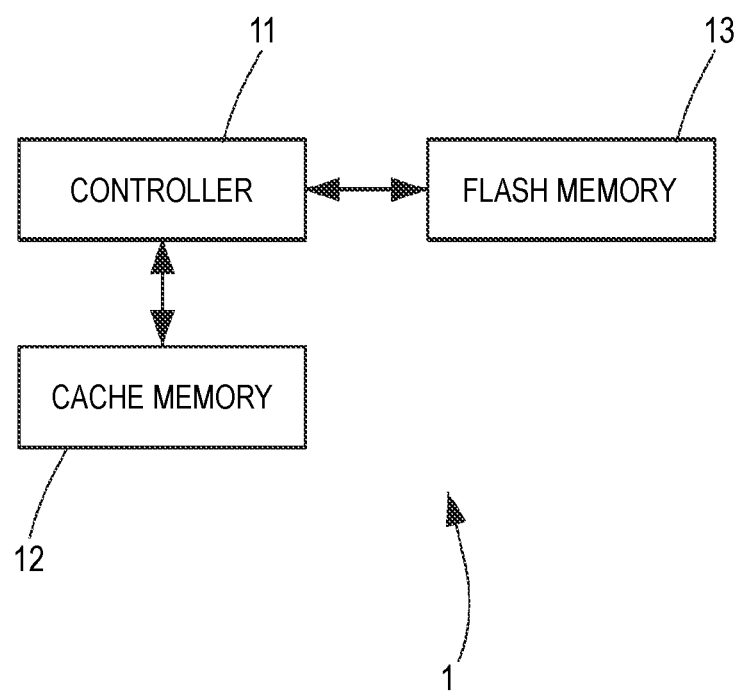
FIG. 1 is a block diagram illustrating a configuration example of a storage device according to an embodiment of the present disclosure.

An embodiment of the present disclosure will be described with reference to the drawings. A storage device 1 according to the embodiment of the present disclosure is a storage using a NAND flash memory, such as an SSD. As shown in FIG. 1, the storage device 1 is configured to include a controller 11, a cache memory 12, and a flash memory 13, and can be connected to a host such as a personal computer (PC).

The controller 11 is configured to include processing circuitry such as a CPU (Central Processing Unit). The controller 11 further includes a storage unit that retrains programs to be executed by the processing circuitry, and so on. The controller 11 receives instructions which are input from the host such as a PC, and performs writing of data in the flash memory 13 and reading of data from the flash memory 13. During reading or writing of data, the controller 11 uses the cache memory 12.

Also, if a predetermined condition such as a condition that an instruction should be received from a host is satisfied, the controller 11 performs a garbage collection process on the flash memory 13. The concrete contents of the processing of the controller 11 will be described below.

The cache memory 12 is configured with a random access memory or the like, and stores data according to instructions from the controller 11.

The flash memory 13 is configured with, for example, a NAND flash memory. The flash memory 13 holds data according to instructions which are input from the controller 11. Also, according to instructions which are input from the controller 11, the flash memory 13 reads out data held therein and outputs the data to the controller 11.

Figure 2:
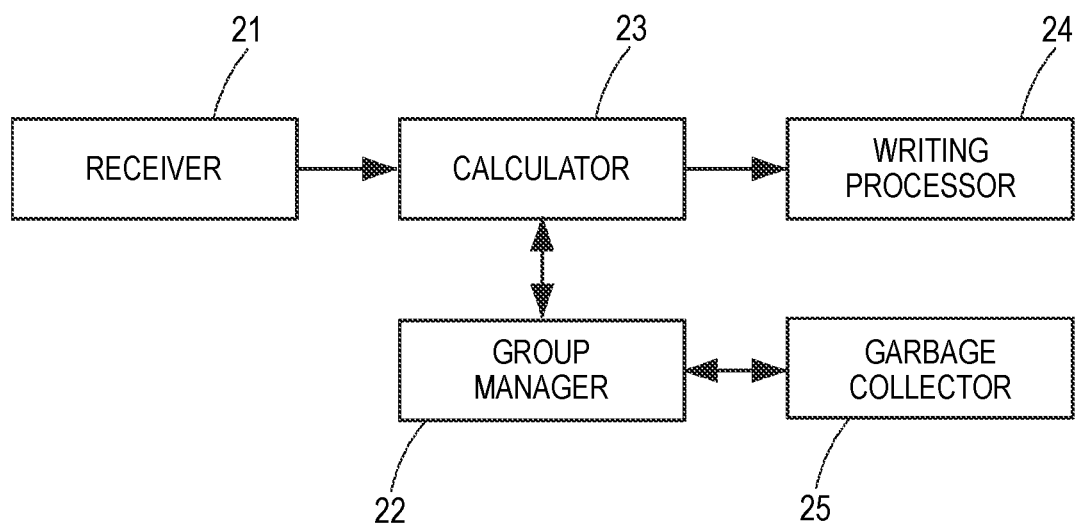
FIG. 2 is a functional block diagram illustrating an example of a controller of the storage device according to the embodiment of the present disclosure.

In an example of the present embodiment, the controller 11 realizes functional blocks shown in FIG. 2 by executing a program stored in the storage unit. In other words, the controller 11 is functionally configured to include a receiver 21, a group manager 22, a calculator 23, a writing processor 24, and a garbage collector 25. In the present embodiment, the controller 11 divides a storage area into a plurality of blocks, and further divides each of the blocks into a plurality of pages, and manages the plurality of pages, like in writing processes which are performed on a general NAND flash memories. Further, the controller 11 performs writing, page by page, during writing of data, and performs deletion, block by block, during deletion of data.

The receiver 21 of the controller 11 receives an instruction including data and address information specifying the destination for writing the corresponding data (an LBA (Logical Block Address) which is the address of the head for writing the data), as a data write instruction, from the host.

The group manager 22 sets groups each of which is composed of N-number of blocks (wherein N is an integer of 2 or greater and N is determined in advance). The group manager 22 stores group identification information identifying the individual groups, and information (which may be serial numbers (hereinafter, referred to as block numbers) assigned to areas defined in units of block size from the head of the storage area) each of which specifies one or more blocks included in a corresponding group, in association with each other, as a group table, in the storage unit (FIG. 3).

The calculator 23 performs a predetermined calculation based on address information included in a data write instruction received by the receiver 21, thereby obtaining group identification information identifying a group including a block including pages where data should be written according to the corresponding write instruction.

Specifically, the calculator 23 multiplies head address information (an LBA) included in a data write instruction received by the receiver 21, by a sector size, and then divides the product of them by a block size, thereby obtaining the quotient d and the remainder r. Then, the calculator 23 obtains group identification information G by G=d+Ceil(r). In the present embodiment, it is assumed that when the remainder r is 0, Ceil(r) is 0, and when the remainder r is not 0, Ceil(r) is 1. By this calculation, address information indicating addresses adjacent to each other are converted into group identification information identifying a group including the same block or consecutive blocks.

Also, the calculator 23 checks whether block number B1, . . . , and BN associated with the obtained group identification information G are held, with reference to the group table. If N-number of block numbers B1, . . . , and BN (hereinafter, the N-number of block numbers will be referred to collectively as the block numbers B) associated with the obtained group identification information G are held, the calculator 23 acquires the corresponding block numbers B. Then, the calculator 23 selects N-number of blocks which are specified by the acquired block numbers B.

Meanwhile, if any block number B associated with the obtained group identification information G is not held in the group table, the calculator 23 selects N-number of blocks having block numbers which are not associated with any group. Then, the calculator 23 stores the block numbers B' of the selected blocks in the group table, in association with the obtained group identification information G.

By the way, since identification information G is obtained by the above-mentioned expression, only when an LBA is 0, as group identification information G, 0 is obtained. Meanwhile, when an LBA is between 1 and [d/(b/s)] (wherein b is block size, and s is sector size, and [d9] is a maximum integer which does not exceed the LBA), as group identification information G, 1 is obtained (since the remainder r in the above-mentioned expression becomes 1 or greater). Therefore, an area where data can be recorded when an LBA is 0 is one block; whereas with respect to any other LBA, {[b/s]−1}-number of LBAs are associated with one group.

In other words, only when an LBA is 0, an area where data can be recorded is wider as compared to the other LBAs. This means that in an area corresponding to an LBA of 0, the acceptable defective-block rate becomes higher as compared to the other areas, and it is possible to secure rewriting resistance.

In general operating systems, in an area corresponding to an LBA of 0, system data such as a master boot record and super blocks are often recorded. Therefore, it is preferable to secure rewriting resistance.

The calculator 23 divides the data included in the write instruction, in units of page size from the head. With respect to each of one or more head addresses of the divided data, the calculator 23 obtains group identification information G corresponding thereto and selects a block corresponding thereto. The head address of the i-th data item from the head of the divided data is an address obtained by adding the product of (i−1) and the page size to the address (LBA) included in the write instruction.

The writing processor 24 writes a corresponding data part of the data included in the write instruction (a data part corresponding to the page size) in each of one or more empty pages included in the N-number of blocks selected by the calculator 23. In the present embodiment, the writing processor 24 may write data in the cache memory 12 at first, instead of directly writing the data in the flash memory 13. In this case, the writing processor 24 obtains the group identification information G in advance by performing the above-mentioned processing, and stores cache identification information, the size of the data to be written, and the group identification information G obtained with respect to the data parts each of which corresponds to the page size, in the cache memory 12, in association with one another.

Then, in this example, at a predetermined timing to write the data of the cache memory 12 in the flash memory 13, the writing processor 24 reads out the data parts each of which correspond to the page size and is associated with the cache identification information and needs to be written, and the group identification information G. The predetermined timing may be the same as the timing to write the data of the cache memory in the flash memory. Also, the writing processor 24 acquires the block numbers associated with the read group identification information G, with reference to the group table. Then, the writing processor 24 writes the data parts held in association with the cache identification information in the cache memory 12, in empty pages included in the blocks of the flash memory 13 specified by the acquired block numbers.

The garbage collector 25 selects any group as a target of a garbage collection process when a timing to perform garbage collection comes. Then, the calculator 23 selects a block which is not associated with any group identification information, as a block which is the transfer destination of each block included in the selected group.

Subsequently, the garbage collector 25 copies the contents of valid pages included in the group which is the target of the garbage collection process, in the selected block. Also, the garbage collector 25 acquires the group identification information of the group which is the target of the garbage collection process. Further, the garbage collector 25 replaces a block number held in association with the acquired group identification information in the group table, with the block number of the selected block.

Then, the garbage collector 25 deletes the data from the blocks (i.e. the transfer sources) included in the group which is the target of the garbage collection process (the blocks which are not associated with any group identification information at that moment).

[Operation]

The storage device 1 of the present disclosure has the above-described configuration, and operates as follows. Hereinafter, writing of data and a garbage collection operation will be described. The other operations are the same operations of general storage devices using NAND flash memories, such as SSDs, so a detailed description thereof will not be made herein.

Also, in the following description, the storage unit of the controller 11 holds information including group identification information and information specifying blocks included in groups (this information may be serial numbers (block numbers) which are assigned to areas defined in units of group size from the head of the storage area), as a group table.

The storage device 1 of the present embodiment receives an instruction including data and address information specifying the destination for writing the corresponding data (an LBA which is the address of the head for writing the data), as a data write instruction, from the host, and operates as follows.

Figure 4:
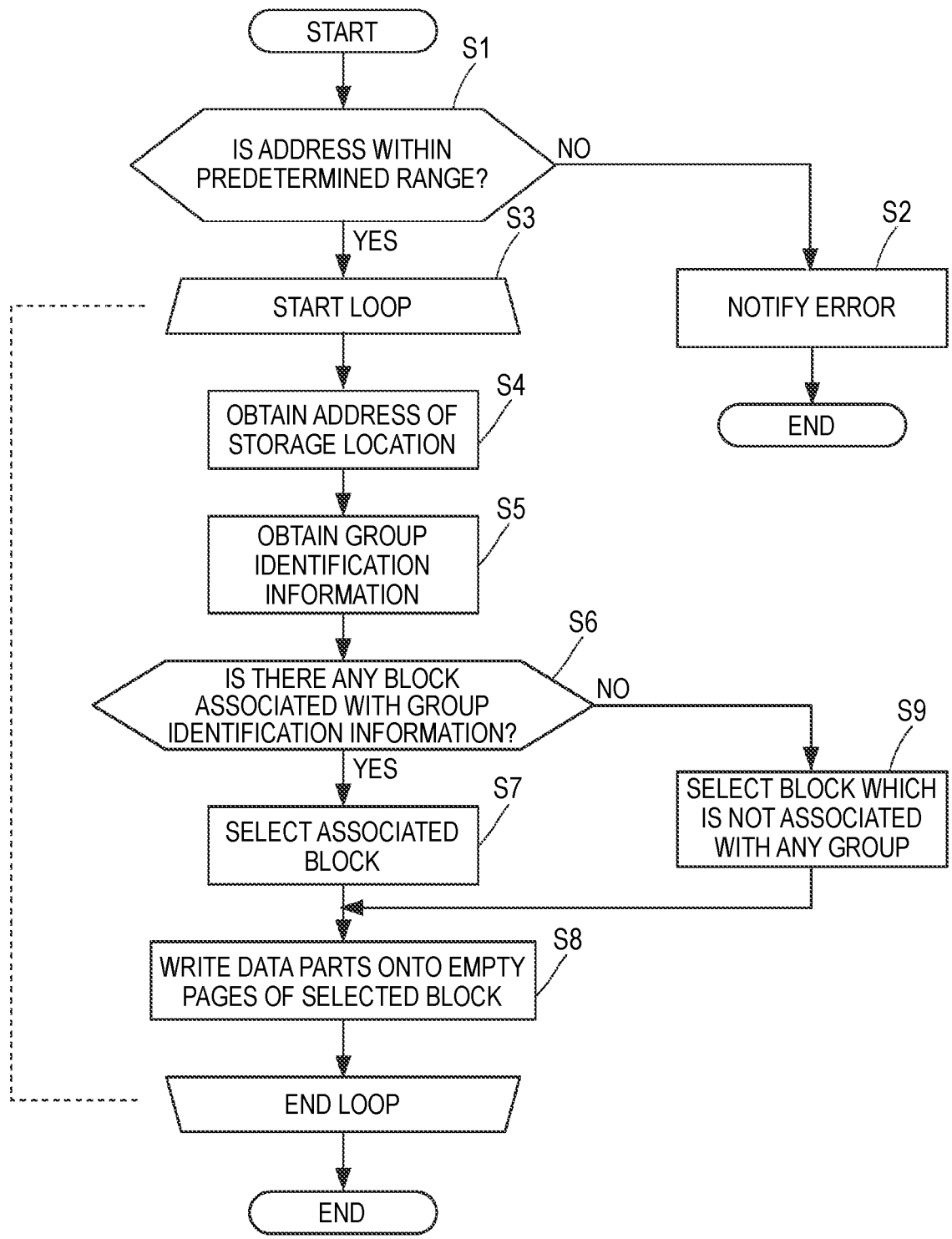
FIG. 4 is a flow chart illustrating an operation example of the storage device according to the embodiment of the present disclosure during a data writing process.

As shown in FIG. 4, the controller 11 of the storage device 1 checks whether the value of the received address information such as the value of an LBA or the number of a sector is within a predetermined range (S1). If the value of the address information is not within the predetermined range ("No" in S1), the controller 11 notifies an error to the host (S2), and ends the processing.

Meanwhile, if it is determined in the process S1 that the value of the address information is within the predetermined range ("Yes" in S1), the controller 11 divides the data included in the write instruction into one or more data parts each of which has a predetermined page size, and repeats the following processing on each of the data parts having the page size (S3).

In other words, with respect to each of the data parts having the page size, the controller 11 obtains the address LBA' of the storage location for the corresponding data part (S4). This calculation can obtain the address of the storage location for the i-th data part from the head, using the LBA received as the data write instruction, as follows.

$$LBA'=LBA+(i-1)\times[\text{Page Size}]$$

The controller 11 multiplies the address LBA' obtained in the process S4 by the sector size, and divides the product by the block size, thereby obtaining the quotient d and the remainder r. Then, the controller 11 obtains the group identification information G of the block by $G=d+\text{Ceil}(r)$ (S5). It is assumed that when r is 0, Ceil(r) is 0, and when r is not 0, Ceil(r) is 1.

Next, the controller 11 checks whether any block number B associated with the group identification information G obtained in the process S5 is held, with reference to the group table (S6).

If block numbers B associated with the group identification information G obtained in the process S5 are held ("Yes" in S6), the controller 11 selects the blocks of the corresponding block numbers B (N-number of blocks) (S7).

The controller 11 performs a process of writing data parts in empty pages included in the N-number of blocks selected in the process S7 (S8). By the way, in the case of using the cache memory 12, the controller 11 stores the corresponding data parts and the group identification information G in the cache memory 12 in association with each other. Thereafter, when writing data parts in the flash memory 13, the controller 11 performs the process of writing the data parts onto empty pages included in the blocks associated with the group identification information G associated with the corresponding data parts.

Then, if there is any data part which has not been processed, the controller 11 returns to the process S4, and carries on the processing. Meanwhile, if there is no data part which has not been processed, the controller 11 ends the processing.

Meanwhile, if it is determined in the process S6 that any block number B associated with the group identification information G obtained in the process S5 is not held ("No" in S6), the controller 11 selects N-number of blocks having block numbers which are not associated with any group. Then, the controller 11 stores the block numbers B of the selected blocks in the group table, in association with the group identification information G obtained in the process S5 (S9).

Then, the controller 11 proceeds to the process S8, and performs a process of writing the data parts in empty pages included in the N-number of blocks selected in the process S9. Also, in this case, when the cache memory 12 is used, the processing described above is performed.

Figure 5A:
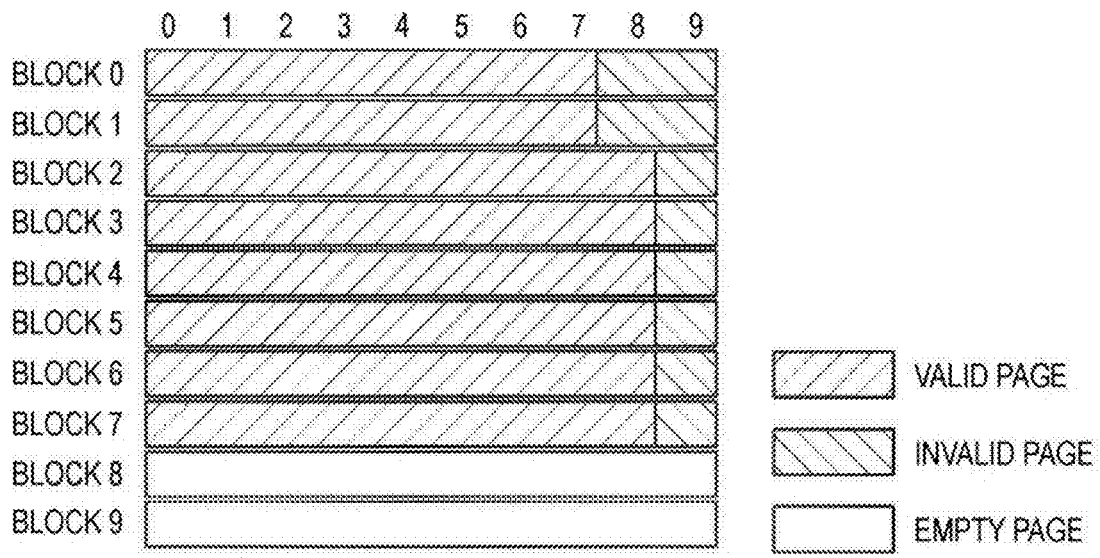
FIG. 5A is an explanatory view illustrating the states of blocks of an example of the related art, contrasting with the storage device of the embodiment of the present disclosure.

In the present embodiment, in order to perform the operation as described above, writing is performed as follows, as compared to the storage device of the related art. In other words, in the storage device of the related art, writing locations are managed in units of page (units smaller than blocks), and during writing of data, writing is performed sequentially from pages in a block including a sufficient number of empty pages. Therefore, even in the case where the host side sequentially writes data while designating consecutive LBAs, if there is not a sufficient number of empty pages in the block where some data has been written until that moment, the other data is written in pages of other blocks. Therefore, invalid pages are likely to be distributed across each block (FIG. 5A). FIGS. 5A and 5B and FIGS. 6A and 6B show the case where the number of blocks is 10 and each block has 10 pages. However, this is for explanation, and more blocks and more pages may exist.

Figure 6A:
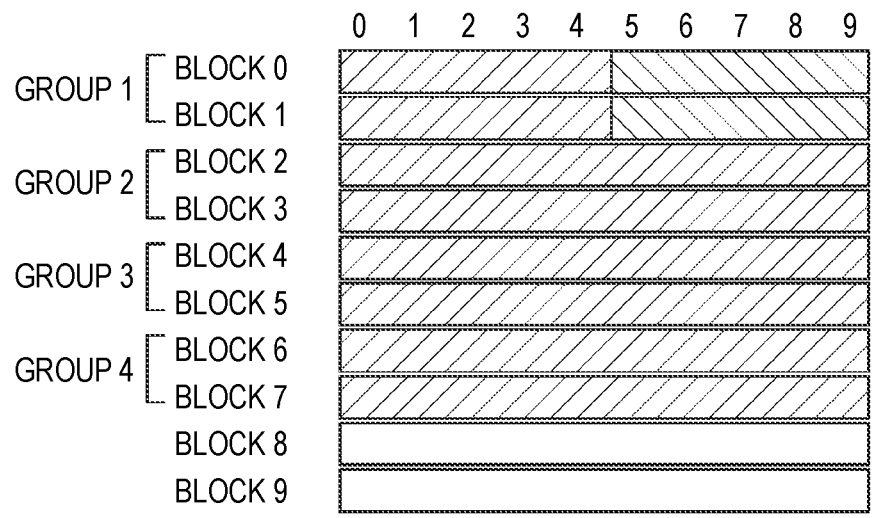
FIG. 6A is an explanatory view illustrating the states of blocks in the storage device of the embodiment of the present disclosure.
Figure 6A:
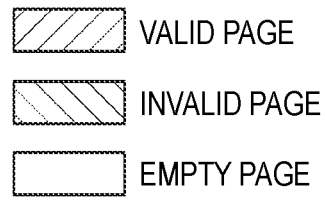

Meanwhile, in the storage device 1 of the present embodiment, when the host side successively writes data at consecutive LBAs, it writes the data onto pages of blocks included in consecutive groups with respect to the consecutive LBAs. Therefore, as shown in FIG. 6A, it is difficult for invalid data to be included in individual blocks. By the way, in the example of FIGS. 6A and 6B, N is 2, and blocks and groups are associated with each other like Block 0 and Block 1 are associated with Group 1 and Block 2 and Block 3 are associated with Group 2, etc.

Figure 5B:
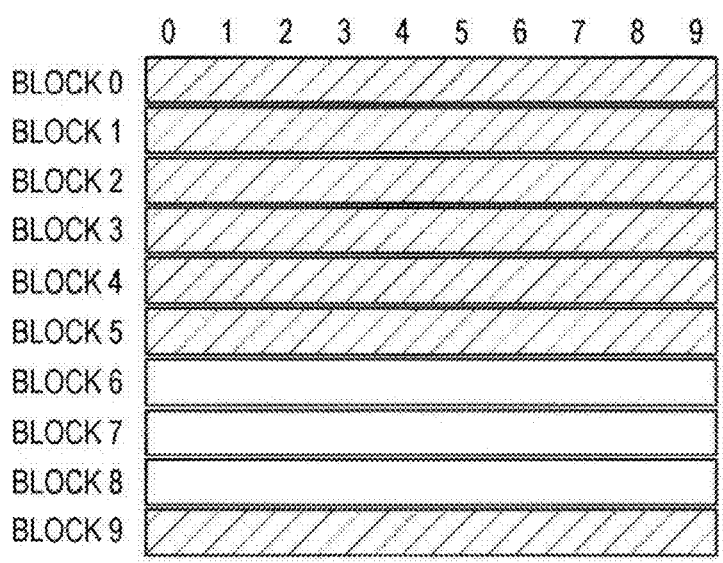
FIG. 5B is an explanatory view illustrating the states of blocks of an example of the related art, contrasting with the storage device of the embodiment of the present disclosure.

As shown in FIGS. 5A and 5B, in the storage device of the related art, in a garbage collection process, valid pages of individual blocks are transferred to empty pages, the processing proceeds as follows.

(1) Valid pages of Block 0 are written in Block 9 (in order to make Block 0 an empty block).

(2) Block 0 is cleared, and seven valid pages from Block 1 are sequentially written in individual pages of Block 0. At this time, with respect to each block from which all pages have already been copied, the data is deleted from the corresponding block.

Therefore, if writing of eight blocks is completed, a process of clearing nine blocks is performed.

Meanwhile, in the storage device 1 of the present embodiment, since data having address LBAs of writing locations adjacent to each other is included in one block or consecutive blocks, invalid data is likely to be collected in the one or more blocks (FIG. 6A). Hereinafter, the garbage collection process of the storage device 1 of the present embodiment will be described.

First, the controller 11 selects any group including invalid pages (in the example of FIGS. 6A and 6B, the group including Block 0 and Block 1), as a target of the garbage collection process. Then, the controller 11 selects a block which is the transfer destination of each block included in the corresponding group, from blocks (Block 9) which are not associated with any group identification information.

Figure 6B:
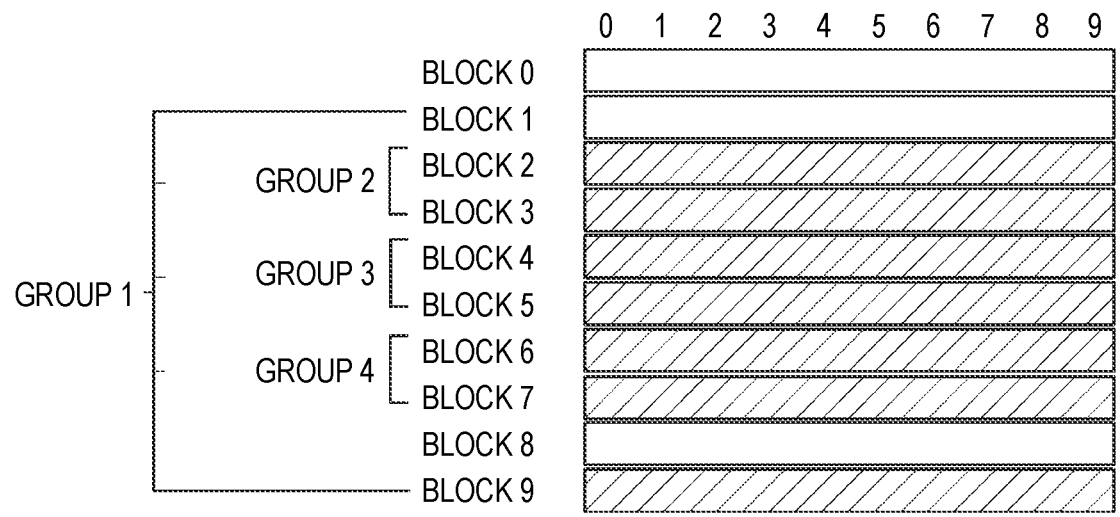
FIG. 6B is an explanatory view illustrating the states of blocks in the storage device of the embodiment of the present disclosure.

Next, the controller 11 copies the contents of valid pages included in the block which is the target of the garbage collection process, into the selected block. In the example of FIGS. 6A and 6B, the controller 11 first copies the valid pages included in Block 0 onto pages included in Block 9.

Next, the controller 11 clears Block 0 from which copying of all pages has been completed, and replaces the block number "0" of the block numbers held in the group table in association with Group 1, with the block number "9" of Group 9 which is the transfer destination. Therefore, with Group 1, the block number "1" and the block number "9" are associated. Further, Block 0 having the block number "0" becomes a block which is not associated with any group identification information.

Next, the controller 11 copies valid pages included in Block 1 onto empty pages of Block 9. Then, the controller 11 clears Block 1 from which copying of all pages has been completed (the block which is the transfer source) (FIG. 6B). At this time, the controller 11 determines whether to replace the block number "1" of the block numbers held in the group table in association with Group 1, with the block number "9". By the way, at this moment, the block number "9" is already associated with Group 1. In this case, the controller 11 may keep the state where Block 1 having the block number "1" is associated with Group 1. Alternatively, the controller 11 may associate Block 8 (a block which is not associated with any group identification information at that moment) adjacent to Block 9, with Group 1, instead of Block 1. In the latter case, Block 1 having the block number "1" becomes a block which is not associated with any group.

By the way, the processing during reading of data from the storage device 1 can be realized by receiving information on an address (an LBA) where data to be read out is held, and specifying a page corresponding to the received LBA, and reading out the data from the specified page, and outputting the data to the host side, similarly in the related art. The specification of the page corresponding to the LBA can be realized by updating a conversion table including LBAs and information specifying pages corresponding to the LBAs in association with each other, for example, during data writing and during garbage collection, and referring to the conversion table.

[Group Size]

In the example of the present embodiment, the group size may be determined according to the characteristics of data to be recorded in the storage device 1, at the time of formatting. For example, if the storage device 1 is primarily intended to record video data whose data size is relatively large, the group size may be set to a relatively large value as compared to the case where the storage device is primarily intended to record data whose data size is small. By the way, during use of the storage device 1 (in a state where user data has been already recorded), the group size cannot be changed.

[Examples of Storage Device]

The storage device 1 of the present embodiment may be an SSD memory, or may be any other device as long as it includes a flash memory. The storage device 1 of the present embodiment can be applied to various devices such as USB dongles and external SSD storage drives.

In an aspect of the present disclosure for solving the problem of the related art described above, a storage device includes: a flash memory; and processing circuitry. The processing circuitry is configured to: divide a storage area of the flash memory into pages to manage the storage area, data being written in units of the pages; perform a deleting process in units of blocks in response to receiving a deletion instruction, each of the blocks including a plurality of pages; receive, as a write instruction for writing data, an instruction including address information specifying a writing location of the data; store, with respect to a plurality of groups in which each group includes one or more blocks, a plurality of group identification information in which each identifies a group and information specifying blocks included in the group in association with each other; perform a predetermined calculation based on the address information included in the received write instruction to obtain group identification information, of the plurality of group identification information, identifying a group including a block including pages onto which data is to be written according to the write instruction; and write the data onto the pages of the block included in the group identified by the obtained group identification information, based on the received write instruction.

According to this configuration, it becomes easy for data written at adjacent addresses to be collectively recorded in adjacent blocks. Therefore, it is possible to reduce the number of times of garbage collection, thereby reducing the waiting time of the host for processing.

The predetermined calculation includes calculation for converting address information indicating addresses adjacent to each other into group identification information identifying a group including the same block or consecutive blocks.

As described above, control is performed such that data required to be written at adjacent addresses is written in pages included in one block or consecutive blocks. Therefore, it becomes easy for data required to be written at adjacent addresses to be collectively recorded in adjacent blocks. Also, it becomes easy for invalid data to be concentrated in adjacent blocks. Therefore, as compared to the case where data are recorded to be distributed across the entire flash memory without performing management in units of group, it is possible to reduce the number of times of garbage collection, thereby reducing the waiting time of the host for processing.

Also, the processing circuitry is configured to select a block to be a transfer destination for each block included in a group which is a target of a garbage collection process, from blocks which are not associated with any group identification information; copy contents of valid pages included in each block included in the group which is the target of the garbage collection process, into the selected block; and replace information specifying a transfer source block which is associated with the group identification information of the group which is the target, with information specifying the selected block.

Since the above-described garbage collection process is performed, the processing load decreases, and it is possible to reduce the waiting time of the host for processing.

In another aspect of the present disclosure, a control method of a storage device including a flash memory includes: dividing a storage area of the flash memory into pages to manage the storage area, data being written in units of the pages; performing a deleting process in units of blocks in response to receiving a deletion instruction, each of the blocks including a plurality of pages; receiving, as a write instruction for writing data, an instruction including address information specifying a writing location of the data; storing, with respect to a plurality of groups in which each group includes one or more blocks, a plurality of group identification information in which each identifies a group and information specifying blocks included in the group in association with each other; performing a predetermined calculation based on the address information included in the received write instruction to obtain group identification information, of the plurality of group identification information, identifying a group including a block including pages onto which data is to be written according to the write instruction; and writing the data onto the pages of the block included in the group identified by the obtained group identification information, based on the received write instruction.

In a further aspect of the present disclosure, a non-transitory computer-readable storage medium stores a program for causing a controller of a storage device including a flash memory to perform a process. The process includes: dividing a storage area of the flash memory into pages to manage the storage area, data is written in units of the pages; performing a deleting process in units of blocks in response to receiving a deletion instruction, each of the blocks including a plurality of pages; receiving, as a write instruction for writing data, an instruction including address information specifying a writing location of the data; storing, with respect to a plurality of groups in which each group includes one or more blocks, a plurality of group identification information in which each identifies a group and information specifying blocks included in the group in association with each other; performing a predetermined calculation based on the address information included in the received write instruction to obtain group identification information, of the plurality of group identification information, identifying a group including a block including pages onto which data is to be written according to the write instruction; and writing the data onto the pages of the block included in the group identified by the obtained group identification information, based on the received write instruction.

What is claimed is:

1. A storage device, comprising:
a flash memory; and
processing circuitry configured to:
   divide a storage area of the flash memory into pages to manage the storage area, data being written in units of the pages;
   perform a deleting process in units of blocks in response to receiving a deletion instruction, each of the blocks including a plurality of pages;
   receive a write instruction for writing data, the write instruction including address information specifying two writing locations of the data adjacent to each other;
   store, with respect to a plurality of groups in which each group includes adjacent blocks and the plurality of groups are within the flash memory, a plurality of group identification information in which each group identification information identifies a group and identifies information specifying blocks included in the group in association with each other;
   perform, based on the address information included in the write instruction, a calculation to obtain a particular group identification information of the plurality of group identification information, the particular group identification information identifying a group including a block or consecutive blocks including pages onto which the data is to be written according to the write instruction; and
   write, based on the write instruction, the data onto the pages of the block included in the group identified by the particular group identification information,
wherein
the calculation is performed as follows:

$$(A*S)/B = \text{quotient } d \text{ and remainder } r, \text{ and}$$

$$G = d + \text{Ceil}(r), \text{ where}$$

A is the address information included in the write instruction, S is sector size, B is block size, G is the particular group identification information, Ceil(r)=0 when r is 0 and Ceil(r)=1 when r is not 0.

2. The storage device according to claim 1, wherein the predetermined calculation includes a calculation for converting the address information into group identification information identifying a group including the same block or consecutive blocks.

3. The storage device according to claim 1, wherein the processing circuitry is further configured to:
    select a block to be a transfer destination for each block included in a group which is a target of a garbage collection process, from blocks which are not associated with any group identification information;
    copy contents of valid pages included in each block included in the group which is the target of the garbage collection process, into the selected block; and
    replace information specifying a transfer source block, which is associated with the group identification information of the group which is the target, with information specifying the selected block.

4. The storage device according to claim 3, wherein the blocks are grouped in the plurality of groups so that a number of garbage collections is reduced.

5. The storage device according to claim 1, wherein the processing circuitry is configured to store the plurality of group identification information in the flash memory.

6. The storage device according to claim 5, wherein the processing circuitry is configured to obtain the group identification information from the plurality of group identification information stored in the flash memory.

7. The storage device according to claim 1, wherein the processing circuitry is further configured to:
    in a case that there is a block associated with the obtained group identification information, select the block and write the data onto the pages of the selected block, and
    in a case that there is not a block associated with the obtained group identification information, select another block that is not associated with the obtained group identification information and write the data onto the pages of the selected another block.

8. The storage device according to claim 7, wherein the another block that is not associated with the obtained group identification information includes empty pages.

9. A control method of a storage device including a flash memory, the control method comprising:
    dividing a storage area of the flash memory into pages to manage the storage area, data being written in units of the pages;
    performing a deleting process in units of blocks in response to receiving a deletion instruction, each of the blocks including a plurality of pages;
    receiving a write instruction for writing data, the write instruction including address information specifying two writing locations of the data adjacent to each other;
    storing, with respect to a plurality of groups in which each group includes adjacent blocks and the plurality of groups are within the flash memory, a plurality of group identification information in which each group identification information identifies a group and identifies information specifying blocks included in the group in association with each other;
    performing, based on the address information included in the write instruction, a predetermined calculation to obtain a particular group identification information of the plurality of group identification information, the particular group identification information identifying a group including a block including pages onto which the data is to be written according to the write instruction; and
    writing, based on the write instruction, the data onto the pages of the block included in the group identified by the particular group identification information, wherein the calculation is performed as follows:

$(A*S)/B$=quotient $d$ and remainder $r$, and $G=d+\text{Ceil}(r)$, where

A is the address information included in the write instruction, S is sector size, B is block size, G is the particular group identification information, $\text{Ceil}(r)=0$ when r is 0 and $\text{Ceil}(r)=1$ when r is not 0.

10. The control method according to claim 9, wherein the predetermined calculation includes a calculation for converting the address information into group identification information identifying a group including the same block or consecutive blocks.

11. The control method according to claim 9, further comprising:
    selecting a block to be a transfer destination for each block included in a group which is a target of a garbage collection process, from blocks which are not associated with any group identification information;
    copying contents of valid pages included in each block included in the group which is the target of the garbage collection process, into the selected block; and
    replacing information specifying a transfer source block which is associated with the group identification information of the group which is the target, with information specifying the selected block.

12. The control method according to claim 9, further comprising storing the plurality of group identification information in the flash memory.

13. The control method according to claim 12, wherein the obtaining includes obtaining the group identification information from the plurality of group identification information stored in the flash memory.

14. The control method according to claim 9, further comprising:
    in a case that there is a block associated with the obtained group identification information, selecting the block and writing the data onto the pages of the selected block; and
    in a case that there is not a block associated with the obtained group identification information, selecting another block that is not associated with the obtained group identification information and writing the data onto the pages of the selected another block.

15. The control method according to claim 14, wherein the another block that is not associated with the obtained group identification information includes empty pages.

16. A non-transitory computer-readable storage medium storing a program for causing a controller of a storage device including a flash memory to perform a process, the process comprising:
    dividing a storage area of the flash memory into pages to manage the storage area, data is written in units of the pages;
    performing a deleting process in units of blocks in response to receiving a deletion instruction, each of the blocks including a plurality of pages;
    receiving a write instruction for writing data, the write instruction including address information specifying two writing locations of the data adjacent to each other;
    storing, with respect to a plurality of groups in which each group includes adjacent blocks and the plurality of groups are within the flash memory, a plurality of group identification information in which each group identification information identifies a group and identifies information specifying blocks included in the group in association with each other;

performing, based on the address information included in the write instruction, a predetermined calculation to obtain a particular group identification information of the plurality of group identification information, the particular group identification information identifying a group including a block including pages onto which data is to be written according to the write instruction; and writing, based on the write instruction, the data onto the pages of the block included in the group identified by the particular group identification information, wherein the calculation is performed as follows:

$(A*S)/B$=quotient $d$ and remainder $r$, and $G=d+\text{Ceil}(r)$, where

A is the address information included in the write instruction, S is sector size, B is block size, G is the particular group identification information, Ceil(r)=0 when r is 0 and Ceil(r)=1 when r is not 0.

17. The non-transitory computer-readable storage medium according to claim 16, wherein the predetermined calculation includes a calculation for converting the address information into group identification information identifying a group including the same block or consecutive blocks.

18. The non-transitory computer-readable storage medium according to claim 16, wherein the process further comprises:
- selecting a block to be a transfer destination for each block included in a group which is a target of a garbage collection process, from blocks which are not associated with any group identification information;
- copying contents of valid pages included in each block included in the group which is the target of the garbage collection process, into the selected block; and
- replacing information specifying a transfer source block is associated with the group identification information of the group which is the target, with information specifying the selected block.

19. The non-transitory computer-readable storage medium according to claim 16, wherein the process includes storing the plurality of group identification information in the flash memory.

20. The non-transitory computer-readable storage medium according to claim 16, wherein the process further includes:
- in a case that there is a block associated with the obtained group identification information, selecting the block and writing the data onto the pages of the selected block; and
- in a case that there is not a block associated with the obtained group identification information, selecting another block that is not associated with the obtained group identification information and writing the data onto the pages of the selected another block.

* * * * *